US012664254B2

(12) United States Patent (10) Patent No.: US 12,664,254 B2
Gross et al. (45) Date of Patent: Jun. 23, 2026

(54) PASSWORD DISCOVERY SYSTEM USING A GENERATIVE ADVERSARIAL NETWORK

(71) Applicant: NOBLIS, INC., Reston, VA (US)

(72) Inventors: Samuel Gross, Manassas, VA (US); Kaushik Datta, Arlington, VA (US)

(73) Assignee: NOBLIS, INC., Reston, VA (US)

( * ) Notice: Subject to any disclaimer, the term of this patent is extended or adjusted under 35 U.S.C. 154(b) by 123 days.

(21) Appl. No.: 18/823,078

(22) Filed: Sep. 3, 2024

(65) Prior Publication Data

US 2025/0068720 A1 Feb. 27, 2025

Related U.S. Application Data

(63) Continuation of application No. 17/339,577, filed on Jun. 4, 2021, now Pat. No. 12,079,326.

(51) Int. Cl.
*G06F 21/46* (2013.01)
*G06N 3/045* (2023.01)
*G06N 3/08* (2023.01)

(52) U.S. Cl.
CPC ............. *G06F 21/46* (2013.01); *G06N 3/045* (2023.01); *G06N 3/08* (2013.01)

(58) Field of Classification Search
CPC ........... G06F 21/46; G06N 3/045; G06N 3/08
See application file for complete search history.

(56) References Cited

U.S. PATENT DOCUMENTS

| | | | |
|---|---|---|---|
| 10,540,490 B2 * | 1/2020 | Chari | .................... H04L 63/083 |
| 11,281,976 B2 * | 3/2022 | Dua | ................... G06V 10/7784 |
| 2011/0208495 A1 | 8/2011 | Yuta | |
| 2019/0236267 A1 | 8/2019 | Sanders et al. | |
| 2020/0074073 A1 * | 3/2020 | Hitaj | .................... G06N 3/0475 |

OTHER PUBLICATIONS

Gross et al., U.S. Office Action dated Dec. 6, 2023, directed to U.S. Appl. No. 17/339,577; 10 pages.

* cited by examiner

*Primary Examiner* — Esther B. Henderson

(74) *Attorney, Agent, or Firm* — Morrison & Foerster LLP

(57) ABSTRACT

Systems and methods for password discovery are provided. A system receives a first password data set comprising known passwords and applies a rule-set to the first data set to generate a second password data set comprising passwords that are believed to be likely to be human-generated. The system trains a generative adversarial network, for generating predicted passwords, using the second data set, for example by incentivizing the GAN to favor passwords in the second data set. The system applies the generative adversarial network to generate a third password data set comprising predicted passwords. The system compares the third password data set to a data corpus to identify a string in the data corpus determined to match one of the predicted passwords in the first plurality of predicted passwords. The identified string may thus be identified as a previously undiscovered password, which may be applied to unlock password-protected systems and/or to further improve password discovery systems.

18 Claims, 3 Drawing Sheets

200

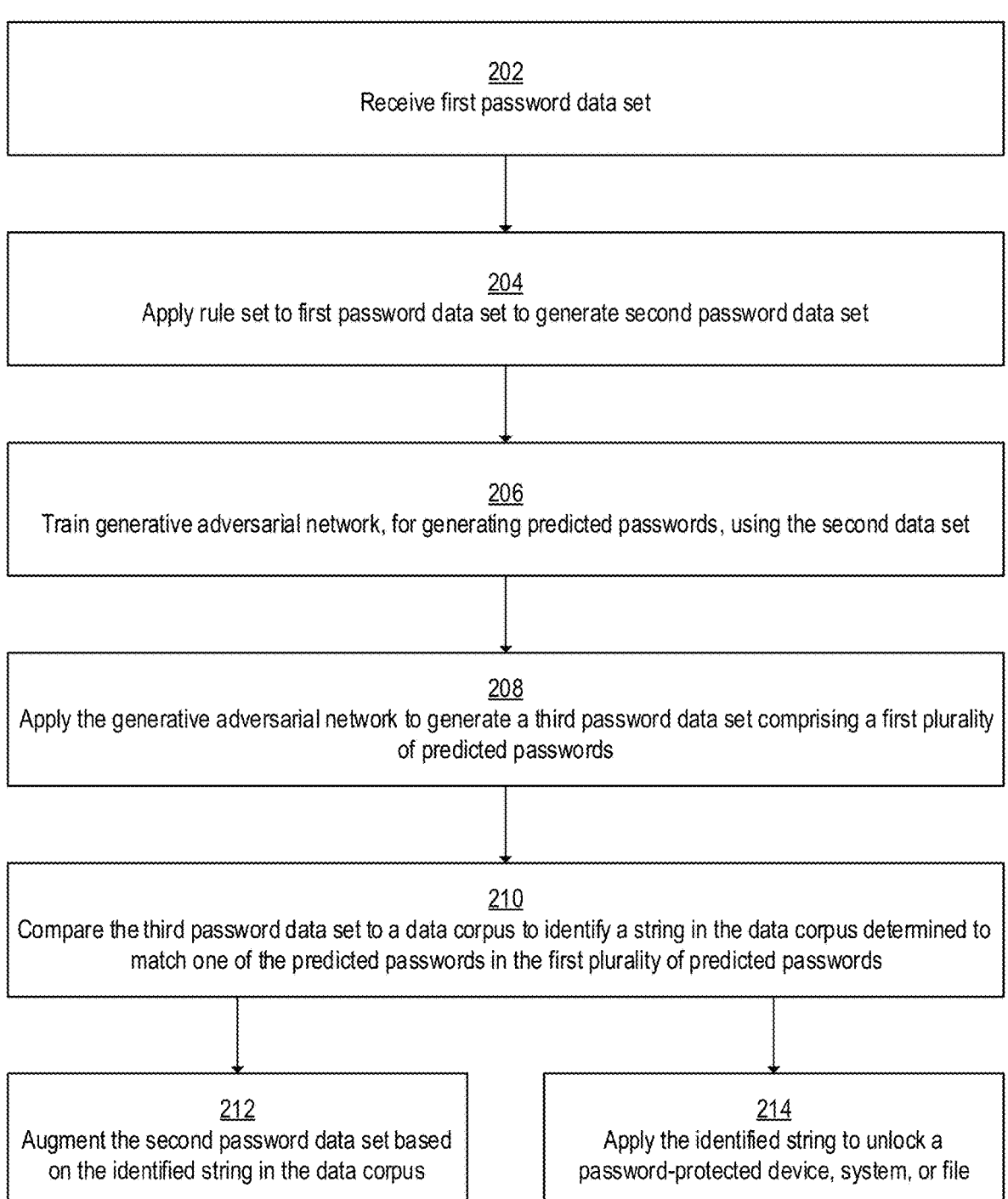

202
Receive first password data set

204
Apply rule set to first password data set to generate second password data set 206
Train generative adversarial network, for generating predicted passwords, using the second data set 208
Apply the generative adversarial network to generate a third password data set comprising a first plurality of predicted passwords 210
Compare the third password data set to a data corpus to identify a string in the data corpus determined to match one of the predicted passwords in the first plurality of predicted passwords 212
Augment the second password data set based on the identified string in the data corpus 214
Apply the identified string to unlock a password-protected device, system, or file

FIG. 2

PASSWORD DISCOVERY SYSTEM USING A GENERATIVE ADVERSARIAL NETWORK

CROSS-REFERENCE TO RELATED APPLICATIONS

This application is a continuation application of U.S. patent application Ser. No. 17/339,577, filed Jun. 4, 2021, the entire contents of which are incorporated herein by reference and for all purposes.

FIELD

This relates generally to password discovery systems, and more specifically to using specialized generative adversarial networks and data matching techniques to discover passwords in large corpuses of data.

BACKGROUND

Developing, maintaining, and expanding robust data sets of known passwords has many valuable applications, including in facilitating lawful access to password-protected data and in improving security by discovering and accounting for compromised passwords. However, discovering unknown passwords often involves considerable computational effort in the form of novel exploitation of known or unknown vulnerabilities. In many cases, passwords discovered by these costly means are then later found to be otherwise available data sets, such as in plaintext in one or more documents captured during an investigation. For example, in a large data set of plaintext, such as emails or text documents, it is often found that one or more documents contain a password in plaintext—such as when one party sends a password for a file in a separate email. Discovery of these passwords in plaintext data sources can circumvent the need to expend significant computational resources and time on password cracking and password discovery approaches using exploits of vulnerabilities.

According to known techniques, the task of discovering passwords in plain text data sets may be approached in one of two ways. First, a brute-force lookup to search for known passwords within the data set may be performed. Using a brute-force lookup, a system may search through a large data set to identify previously-known passwords, such as passwords that have been leaked, thereby discovering instances in which the leaked passwords are being reused in different settings. Second, machine learning classification algorithms trained on an underlying collection of leaked passwords may be applied to the plain text data set to attempt to identify in the data set previously-leaked passwords or passwords that are statistically similar to those previously leaked passwords.

SUMMARY

As explained above, known techniques for discovering password data in large data sets include (1) applying brute-force lookups to identify previously-known passwords within the data set and (2) applying machine learning algorithms trained on underlying data sets of previously-known passwords in order to identify passwords within the large data set that are previously known or are similar to one or more previously-known passwords. However, known techniques for password discovery have several shortcomings.

First, brute-force lookup techniques are computationally expensive and time-consuming, due at least to the fact that plaintext data sets to be searched may be intractably large, for example containing billions of underlying documents. Searching through said data sets without prior knowledge of whether and where passwords may be located therein may be infeasible from a computational resources standpoint and/or from an efficiency standpoint. Furthermore, the effectiveness of brute-force lookup techniques depends entirely on the accuracy and exhaustiveness of the data sets representing previously-known passwords, such that a password that has not previously been leaked or discovered cannot be discovered by this technique alone. Moreover, the accuracy of detecting novel passwords is directly proportional to the size of the underlying dictionary used for detection (the computational complexity of the brute-force approach is a function of both the corpus of data to be searched as well as the size of the dictionary used for comparison), and therefore the task of comparing strings against large underlying dictionaries can also become intractable.

Second, known machine-leaning techniques are ineffective at successfully identifying passwords that are not already known, due at least to the fact that it is difficult to train machine learning models on a large enough data set for the trained model to be effective and accurate. As a result, machine learning models according to known techniques are trained on small random samples of known passwords, and the resulting trained algorithms are ineffective and inaccurate, returning a high number of false negatives and false positives. For example, experimental results with basic machine learning classification models trained according to known techniques and random samples have been shown to return a substantial number of false negative results.

Thus, there is a need for improved systems and methods for password discovery, including systems and methods for effectively, efficiently, quickly, and accurately identifying previously-known and previously-unknown passwords in large data sets. In particular, there is a need for discovering previously-unknown passwords in large data sets with higher accuracy and effectiveness than known machine-learning-based systems.

Disclosed herein are systems and methods for password discovery using specialized generative adversarial networks and data matching techniques to discover passwords in large corpuses of data. The systems and methods disclosed herein may address one or more of the above-identified needs. In some embodiments, a specialized generative adversarial network system is applied in order to generate a potential password data set, such that the generated potential password data set can then be compared to a large corpus of data (e.g., a plaintext data set) in order to identify one or more passwords in the large corpus of data.

Rather than training the generative adversarial network (GAN) based solely on a randomly-selected subset of passwords taken from a set of known (e.g., leaked or compromised) passwords, the system may be configured such that the GAN is trained based at least in part on a specific dictionary data set of passwords that are selected or generated using one or more dictionary data selection/generation rules (e.g., algorithms). These rules may be configured to select a subset of passwords from a known password data set and/or to generate one or more synthetic passwords based on the known password data set.

The rules used to select (and/or generate) the dictionary data set of passwords may be configured based on patterns of human-generated password data that are not efficiently modeled using standard generative adversarial networks. In general, the rules may be configured to help account for the fact that human-generated passwords generally fall within an extremely small subset of the entire password domain (e.g., the domain available based on permissible characters and permissible password string length). The proportion of the entire password domain used by humans has been a topic of increased scientific interests in several disciplines, including behavioral psychology, mathematics, and computer science, and many different estimations of the proportion used by humans have been given. However, it is believed that the true proportion is small (e.g., 5% or less), and that this order of magnitude is governed principally by the many recurring human behavior processes observed to be involved in generating complex but memorable passwords. Improvements in the accuracy of password detection therefore depends on the ability to model these complex human behaviors. Because human-generated passwords may be so dramatically clustered within a small area of the password domain, training a GAN based solely on training data that is randomly selected from amongst known passwords is not the most effective way to training a GAN to generate and predict real human-generated passwords because random samples will fail to produce passwords that might better reflect the underlying human behaviors responsible for their generation. Thus, the rules for dictionary data selection (and/or generation) may be applied in order to create one or more password dictionary data sets that are a better representation of a targeted human behavior and that may be used during the training process of the GAN. For example, rules for selecting passwords for a dictionary data set may be based on spatial keyboard patterns that human users may leverage in order to generate low-effort and easily-memorable password variations, or other structures such as strings containing digit years or other date formats.

Once the password dictionary data set is created using the rules for password selection/generation, a generative adversarial network (GAN) may be trained based at least in part on the password dictionary data set. In some embodiments, while a conventional training data set of passwords may still be provided to the GAN and used by the GAN during training, the dictionary data set generated using the specialized password selection/generation rules may also be used during the training of the GAN. In some embodiments, the GAN may be configured such that, during training, when the GAN generates a password that is included in the dictionary data set, the GAN's loss function may be adjusted in order to incentivize the GAN to favor passwords included in the dictionary data set that was created using the specialized rules. (Adjusting the loss function may, in some embodiments, include adjusting a loss function of a generative component of the GAN or a loss function of a discriminative component of the GAN (but, in some embodiments, not both).)

Once the GAN has been trained in accordance with the techniques described above to favor passwords included in the dictionary data set that was created using the specialized rules, the GAN may be used to generate a massive data set of potential passwords, including for example tens of billions or hundreds of billions of potential passwords. The generated massive data set of potential passwords may then be compared against the large corpus of data (e.g., plaintext data) in which one or more passwords are sought to be discovered. By identifying matches between the massive data set of potential passwords and the corpus of data, passwords previously unknown may be identified.

In some embodiments, comparing the generated massive data set of potential passwords against the large corpus of data may include one or more techniques configured to make the comparison process more efficient and more effective. For example, the massive data set of potential passwords may be segmented into subsets, and each subset may be compared individually against the corpus of data. In some embodiments, a plurality of probabilistic data structures (e.g., Bloom filters) may be generated, each representing the passwords in a respective one of the subsets. Each of the probabilistic data structures may then be queried in order to quickly determine whether the subset probably includes a match against the corpus of data (with a tunable, known false-positive rate) or whether the subset definitely does not include a match against the corpus of data (that is, results may be returned with no false negatives). When a probable match for a subset is identified by interrogating the probabilistic data structures, potential passwords included in the indicated subset may be individually compared to the corpus of data using a brute-force matching technique and/or using a probabilistic matching technique. If a match is identified within the identified subset, then the match may be outputted by the system as a newly-identified password.

In some embodiments, the system may include a feedback loop configured to augment the dictionary data set that was originally created using the specialized rules as described above. In some embodiments, potential passwords that are included in a potentially-matching subset and/or potential passwords that are identified by a deterministic and/or probabilistic matching technique may be used to augment the dictionary data set. In some embodiments, the one or more potential password(s) may themselves be added to the dictionary data set, and in some embodiments, the potential password(s) may be used to extrapolate a plurality of similar potential passwords which may be added to the dictionary data set. Once the dictionary data set has been augmented in this manner, the GAN may then be trained in order to further improve performance or target other newly identified human behaviors, and more potential passwords may be generated for inclusion in an updated version of the massive data set of potential passwords. The updated version of the massive data set of potential passwords may then be compared to the large data corpus—and/or compared to one or more other large corpuses of data, such that the system may continue to discover additional unknown passwords.

In some embodiments, a system for identifying passwords in a data corpus is provided, the system comprising one or more processors configured to: receive a first password data set comprising a plurality of known passwords; apply a rule-set to the first password data set to generate a second password data set; train a generative adversarial network, for generating predicted passwords, using the second data set; apply the generative adversarial network to generate a third password data set comprising a first plurality of predicted passwords; and compare the third password data set to a data corpus to identify a string in the data corpus determined to match one of the predicted passwords in the first plurality of predicted passwords.

In some embodiments of the system, applying the rule-set to the first password data set to generate the second password data set comprises filtering the first password data set to select a subset of the plurality of known passwords for inclusion in the second password data set.

In some embodiments of the system, applying the rule-set to the first password data set to generate the second password data set comprises generating a second plurality of predicted passwords generated based on one or more of the plurality of known passwords.

In some embodiments of the system, the one or more processors are further configured to augment the second password data set based on the identified string in the data corpus.

In some embodiments of the system, augmenting the second password data set based on the identified string in the data corpus comprises: applying an extrapolation algorithm to the identified string to generate an extrapolated string; and adding the extrapolated string to the second password data set.

In some embodiments of the system, augmenting the second password data set based on the identified string in the data corpus comprises: applying an extrapolation algorithm to a subset of the third password data set associated with the identified string to generate one or more extrapolated strings; and adding the one or more extrapolated strings to the second password data set.

In some embodiments of the system, applying the generative adversarial network comprises training the generative adversarial network by: generating, by a generator of the generative adversarial network, a predicted password; determining whether the generated predicted password is included in the second password data set; and in response to determining that the generated predicted password is included in the second password data set, modifying a loss function of the generative adversarial network.

In some embodiments of the system, modifying the loss function of the generative adversarial network comprises reducing a loss function of the generator.

In some embodiments of the system, modifying the loss function of the generative adversarial network comprises reducing a loss function of a discriminator of the generative adversarial network.

In some embodiments of the system, modifying the loss function of the generative adversarial network comprises modifying the loss function by an amount, wherein the amount is determined in accordance with a rule in the rule-set that is associated with the generated predicted password that is included in the second password data set.

In some embodiments of the system, comparing the third password data set to the data corpus to identify the string in the data corpus comprises applying a matching algorithm to identify the string in the data corpus.

In some embodiments of the system, the lookup matching comprises one or both of: a deterministic matching algorithm, and a probabilistic matching algorithm.

In some embodiments of the system, comparing the third password data set to the data corpus to identify the string in the data corpus comprises: dividing the third password data set into a plurality of subsets; selecting, based on comparison of each of the plurality of subsets to the data corpus, one of the plurality of subsets, wherein the identified string is included in the selected subset.

In some embodiments of the system, selecting one of the plurality of subsets comprises: generating, based on the plurality of subsets, a plurality of respective probabilistic data structures; and querying, using the data corpus, each of the plurality of probabilistic data structures to determine whether each respective probabilistic data structure indicates (a) a probable match between the data corpus and one or more of the predicted passwords in the corresponding data set, or (b) a definite non-match between the data corpus and any of the predicted passwords in the corresponding data set.

In some embodiments of the system, the one or more processors are further configured to apply the identified string to unlock a password-protected device, system, or file.

In some embodiments, a non-transitory computer-readable storage medium storing instructions for identifying passwords in a data corpus, the instructions configured to be executed by one or more processors of a system to cause the system to: receive a first password data set comprising a plurality of known passwords; apply a rule-set to the first password data set to generate a second password data set; train a generative adversarial network, for generating predicted passwords, using the second data set; apply the generative adversarial network to generate a third password data set comprising a first plurality of predicted passwords; and compare the third password data set to a data corpus to identify a string in the data corpus determined to match one of the predicted passwords in the first plurality of predicted passwords.

In some embodiments, a method for identifying passwords in a data corpus, the method performed by a system comprising one or more processors, the method comprising: receiving a first password data set comprising a plurality of known passwords; applying a rule-set to the first password data set to generate a second password data set; training a generative adversarial network, for generating predicted passwords, using the second data set; applying the generative adversarial network to generate a third password data set comprising a first plurality of predicted passwords; and comparing the third password data set to a data corpus to identify a string in the data corpus determined to match one of the predicted passwords in the first plurality of predicted passwords.

In some embodiments, any one or more of the characteristics of any one or more of the systems, methods, and/or computer-readable storage mediums recited above may be combined, in whole or in part, with one another and/or with any other features or characteristics described elsewhere herein.

BRIEF DESCRIPTION OF THE FIGURES

FIG. 2 depicts a method for password discovery, in accordance with some embodiments.

DETAILED DESCRIPTION

Described herein are systems and methods for password discovery that use specialized generative adversarial networks (GANs) trained in accordance with dictionary data sets selected and/or generated using specialized password-selection/generation rules. The specialized GAN may be used to generate massive data sets of potential passwords that may be compared to large corpuses of data (e.g., plaintext data) to determine whether the corpuses of data contain one or more previously unknown-passwords matching a potential password generated by the GAN. The systems and methods disclosed herein may address the problems and shortcomings of known systems and methods for password discovery as described above.

Figure 1:
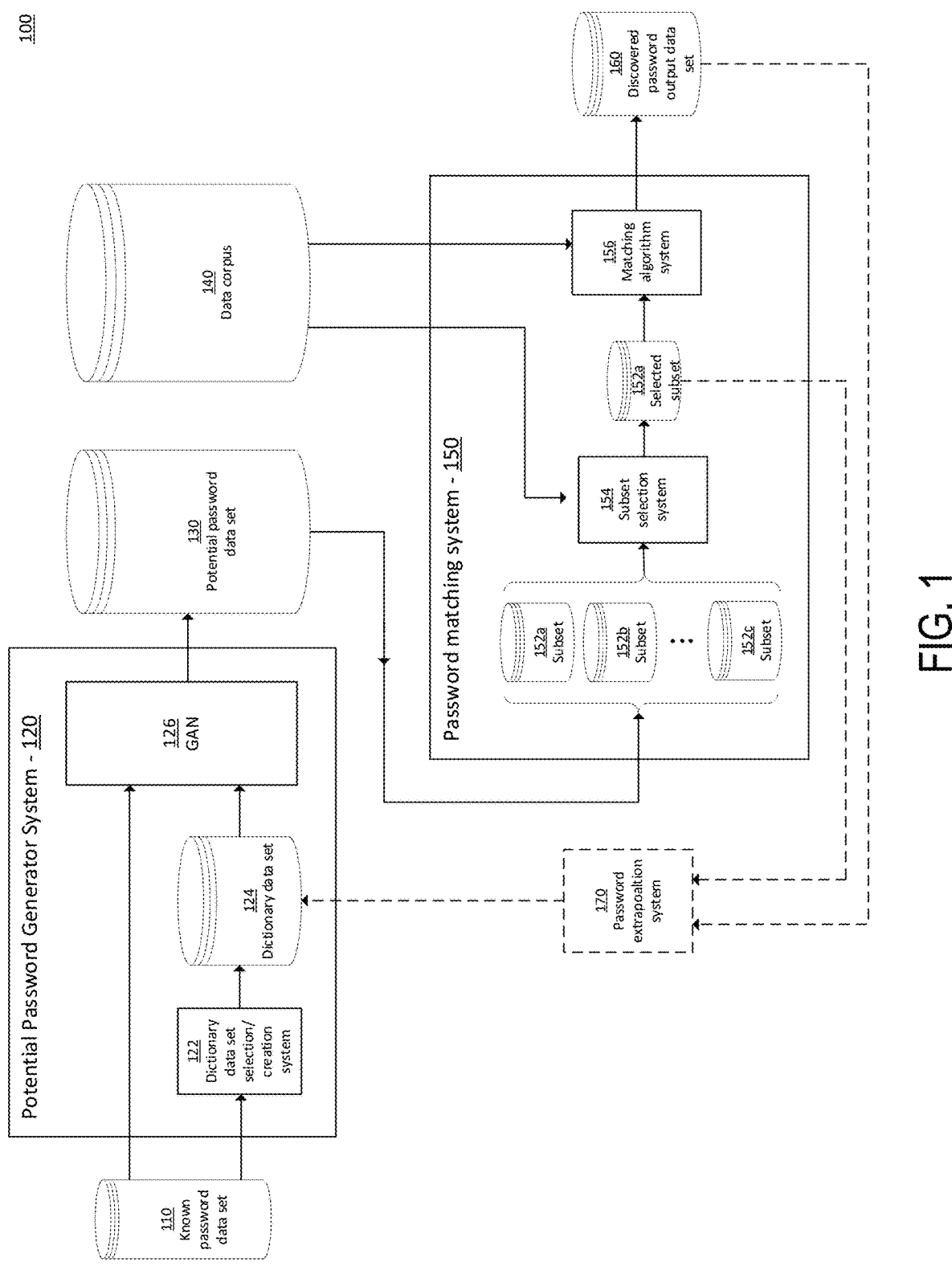
FIG. 1 depicts a system for password discovery, in accordance with some embodiments.

FIG. 1 depicts a system 100 for password discovery, in accordance with some embodiments. As shown and described herein, system 100 may be configured to train a specialized GAN to generate a data set of potential passwords and to then compare the generated data set against a corpus of data (e.g., plaintext data) in order to identify matches between the generated potential passwords and strings in the data corpus, such that those matching strings may be identified as previously-unknown passwords. As described herein, system 100 may leverage specialized password dictionary data selection/generation rules, probabilistic matching techniques, and a feedback loop for augmenting the dictionary data set used to augment training of the GAN, each of which may provide improved performance over prior systems.

As shown in FIG. 1, system 100 may include known password data set 110, potential password generator system 120, potential password data set 130, data corpus 140, password matching system 150, discovered password output data set 160, and password extrapolation system 170. System 100 may be a computerized system including one or more processors, one or more computer storage mediums, one or more communication devices, and one or more input/output devices. While the components of system 100 are shown, by way of example, in a particular arrangement in FIG. 1, a person of ordinary skill in the art will appreciate, in light of the disclosure herein, that one or more components of system 100 may be combined, provided by multiple separate system, provided by a single system, and/or provided in a distributed arrangement. In some embodiments, one or more of the data processing functionalities of the various components of system 100 may be provided by a single processor, by a plurality of processors, and/or by a distributed processing system. In some embodiments, one or more of the data storage functionalities of the various components of system 100 may be provided by a single computer storage device (e.g., a single database), by a plurality of computer storage devices, and/or by a distributed computer storage system.

The components of system 100 are described below in connection with the manner in which they may work together to perform password discovery.

Known password data set 110 may include all or part of any one or more data sets of known passwords, such as known passwords that have been voluntarily provided, obtained from prior data leaks, and/or obtained from prior password discovery efforts. In some embodiments, known password data set 110 may be stored by any suitable computer storage medium and in any suitable format, such as being provided as a database of known passwords. In some embodiments, passwords in known password data set 110 may be provided as raw data (e.g., raw strings of characters representing the underlying known passwords). In some embodiments, passwords in known password data set 110 may be provided along with metadata representing information about one or more passwords included in the data set, such as metadata indicating the source of the password, whether the password is known to be human-generated or machine-generated, a geographic region associated with the password, a language associated with the password, and/or information about the domain space in which the password was generated (including, e.g., permissible characters for the password, string minimum and maximum for the password, character requirements for the password, and/or complexity requirements for the password).

As shown in FIG. 1, known password data set 110 may be configured such that it is communicatively coupled (e.g., via one or more wired or wireless network communication interfaces) to potential password generator system 120. System 100 may be configured such that some or all of the passwords in known password data set 110 are communicated to potential password generator system 120 for processing as described herein.

Potential password generator system 120 may include any one or more components of system 100 (e.g., data processing components and/or data storage components) that are configured to generate potential passwords, e.g., synthetic passwords that may or may not match real and as-yet undiscovered passwords. As shown in FIG. 1, potential password generator system 120 may include dictionary data set selection/creation system 122 (including one or more processors), dictionary data set 124 (stored on one or more computer storage mediums), and generative adversarial network (GAN) 126.

System 120 may be configured such that system 120 receives (or is configured to be able to receive) one or more passwords from known password data set 110. System 120 may process received passwords from known password data set 110 by using dictionary data set selection/creation system 122 to select and/or generate passwords to be stored in dictionary data set 124. In some embodiments, system 122 may apply one or more filtering rules (e.g., algorithms) to select a subset of passwords from known password data set 110 for inclusion in dictionary data set 124. In some embodiments, system 122 may apply one or more password generation (e.g., password creation, password extrapolation, etc.) rules (e.g., algorithms) to generate one or more synthetic passwords, based on known password data set 110, for inclusion in dictionary data set 124.

In some embodiments, the one or more rules applied by system 122 to select and/or generate passwords for inclusion in dictionary data set 124 may be hard-coded deterministic rules, may be dynamically-applicable adaptive rules, may be programmatically-determined rules that are automatically determined based on one or more data inputs, and/or may be human-specified rules based on one or more manual inputs or configurations provided by a human user of system 100.

In some embodiments, one or more of the rules applied by system 122 may be configured based on patterns in human-generated password data that are not efficiently modeled using standard generative adversarial networks. In some embodiments, the rules applied by system 122 may be configured to help account for the fact that human-generated passwords generally fall within a very small space of the available password domain. Because human-generated passwords may be clustered within a small area of the password domain, training a GAN based solely on a training data set of randomly-selected known passwords may be an ineffective way to training the GAN to predict real human-generated passwords. Thus, the rules applied by system 122 may be configured to select/generate passwords for dictionary data set 124 that allow GAN 126 to be trained to more accurately and efficiently generate passwords that resemble or match human-generated passwords.

In some embodiments, the one or more rules applied by system 122 may be configured based on patterns in human-generated password data by being manually configured by a human operator, programmer, or user. In some embodiments, the one or more rules applied by system 122 may be configured based on patterns in human-generated password data by using one or more automated systems to generate and/or configure the rules based on input password data and/or metadata; for example, the rules may be configured and/or refined using machine learning and based on input human-generate password data and metadata.

In some embodiments, the one or more rules applied by system 122 may include one or more rules based on spatial keyboard patterns (and/or spatial number pad patterns) that humans may be likely to exploit in order to generate low-effort and/or easily-memorable password variations.

Rules based on spatial patterns may include the application or one or more specialized metrics to evaluate whether a given string is likely to have been formed by tracing a pattern or figure on the keyboard or number pad (wherein the metrics may account for one or more keyboard or number pad layouts). The one or more metrics may account for the likelihood that a human user may trace a spatial pattern in a straight line on a number pad, a contiguous shape on a number pad, and/or an alternating or key-skipping pattern on a keyboard or number pad. The one or more metrics may generate a value that may then be used to rank strings according to the likelihood that a spatial pattern exists within a password string.

In some embodiments, the one or more rules applied by system 122 may include one or more rules based on the presence of substrings which are also words or phrases often used in several languages, for example popular names of persons, cultural references, idioms, or other core vocabulary words.

In some embodiments, the one or more rules applied by system 122 may include one or more rules based on statistical metrics for identifying phonetic values from human speech, such as the proportion or ordering of vowels and consonants. Such metrics would provide a score proportional to the likelihood a string contains phonetically spelled speech patterns, for example a word or phrase from one language spelled phonetically using the alphabet of another language.

In some embodiments, the one or more rules applied by system 122 may include one or more rules based on detection of the use of steganography in a password string. Such rules may be based on substitution patterns of special characters for characters in a word, phrase, or phonetic spelling that may otherwise be captured in other behavior-based rules. In some embodiments, stenography-based rules may be dependent on or work in conjunction with the results obtained from other behavior-based rules.

In some embodiments, the one or more rules applied by system 122 may be configured to create a plurality of different sub-dictionaries that may all be included in dictionary data set 124. In some embodiments, dictionary data set 124 may be de-duplicated to account for passwords that appear in multiple sub-dictionaries. In some embodiments, system 122 may be configured to store one or more selected and/or generated passwords with metadata indicating a rule that was used to select/generate the password and/or a sub-dictionary in with which the password is associated. In some embodiments, metadata associated with the dictionary password may be leveraged during training of GAN 126, for example by informing an amount by which a loss function of GAN 126 should be reduced in the event that GAN 126 generates a password matching a particular dictionary password (or matching a particular sub-dictionary).

As shown in FIG. 1, system 122 may be communicatively coupled to dictionary data set 124, which may be stored on one or more computer storage mediums, and in any suitable format, such as being stored as a database. Dictionary data set 124 may additionally be communicatively coupled to GAN 126, such that passwords included in dictionary data set 124 may be provided to GAN 126 so that GAN 126 may use said dictionary password data as part of the training process, as explained below.

In some embodiments, GAN 126 may include a generative component and a discriminative component and may be configured such that the generative component generates synthetic (e.g., predicted) passwords and the discriminative component attempts to classify passwords (whether genuine passwords or predicted synthetic passwords created by the generative component) as genuine or synthetic. GAN 126 may be iteratively trained using training data, wherein some portion of the training data may be provided to the generative component to form the basis of a generative model applied by the generative component for generating synthetic password data, and wherein some portion of the training data may be provided to the discriminative component in order for the discriminative component to attempt to classify the training data as genuine (a correct classification) or as synthetic (an incorrect classification). GAN 126 may be configured such that, during training, configurations of the generative component and/or the discriminative component are iteratively adjusted based on whether the discriminative component is successful or unsuccessful in attempts to classify genuine and synthetic passwords. As shown in FIG. 1, GAN 126 may be configured such that it may be trained using training data taken from known password data set 110 and/or from dictionary data set 124.

In some embodiments, GAN 126 may be configured to operate in accordance with the following arguments:

TABLE 1

| Generative Adversarial Network training arguments | |
| --- | --- |
| Parameter Name | Parameter Description |
| training-data | Path to training data file (one password per line) |
| output-dir | Output directory |
| checkpoint-iter | Save model checkpoints after this many iterations |
| iters | Number of training iterations |
| epochs | # of times data set will be repeated during training |
| batch-size | # passwords used to train discriminator in each critic_iter |
| max-pwd-length | Max password length |
| num-layers | Hidden layer dimensionality for generator and discriminator |
| cdiscrim-iters | # discriminator weight updates per generator update |
| lambda | Gradient penalty lambda hyperparameter |
| buffer-size | # passwords loaded into memory at a time. This is used to avoid exhausting available memory. |
| log-every | Log and plot progress every X iterations |
| csv-data | Indicates that input file is stored in .csv format |
| restore_from | Resume training from the specified checkpoint |
| restore_epoch | Resume training from the specified epoch |

In some embodiments, performance of GAN 126 following training of the GAN may be assessed by using GAN 126 to generate a large number of synthetic passwords and to then deterministically check whether the generated passwords are members of a validation set of genuine passwords (wherein the validation set was not provided to the GAN during training). Performance of GAN 126 may be assessed based on the number of passwords of the validation data set that GAN 126 correctly predicts, such that a higher number of correctly predicted passwords indicates better performance by GAN 126.

In some embodiments, GAN 126 may be configured such that—in addition to iterative adjustments that may be made to a generative model applied by the generative component and/or to a discriminative model applied by the discriminative component based on whether the discriminative component is successful or unsuccessful in classifying synthetic passwords generated by the generative component—GAN 126 is further incentivized during the training process to specifically favor passwords that are included in dictionary data set 124. For example, in some embodiments, GAN 126 may be configured such that, during training, if the generative component of GAN 126 generates a predicted password that matches a password that is included in dictionary data set 124, then a loss function of GAN 126 may be adjusted, for example by being adjusted (e.g., reduced) by a predetermined (e.g., user-selected) and/or dynamically determined (e.g., programmatically determined) amount. In some embodiments, an amount by which the loss function is reduced may be based, at least in part, on a rule that was used to generate the password in dictionary data set 124 that was matched by GAN 126; in some embodiments, matching dictionary passwords generated by certain rules may cause the loss function to be reduced by a greater amount than matching dictionary passwords generated by certain other rules.

In some embodiments, a loss function of the generative component may be adjusted; in some embodiments, a loss function of the discriminative component may be adjusted. In some embodiments, a loss function of either the generative component or of the discriminative component may be adjusted, but not both. In some embodiments, a loss function of the generative component and the discriminative component may both be adjusted, either by a same amount or by a different amount, and either in a same manner (e.g., according to a same set of criteria) or in a different manner.

Adjustment to the loss function of GAN 126 as described herein may train GAN 126 to favor passwords included in dictionary data set 124 (and/or to favor passwords similar to those in dictionary data set 124) more strongly than GAN 126 would if it were trained solely based on the outcomes of attempted classifications by the discriminative component. In some embodiments, training GAN 126 in the manner described herein may avoid the need to train GAN 126 using the entire contents of dictionary data set 124 as a conventional training data set, which may be impractically computationally expensive according to previously-known techniques.

Following training of GAN 126, GAN 126 may be validated to verify that it is performing at a sufficient level. For example, GAN 126 may be used to generate a test set of passwords, which may be deterministically compared to a validation set of genuine passwords. In some embodiments, the test set of passwords may be measured against specialized metrics that evaluate the likelihood of the passwords being created by a set of rules. In some embodiments, performance of GAN 126 may be considered sufficient when the rate at which it accurately predicts passwords in the validation set exceeds a predefined (or dynamically determined) threshold rate. In some embodiments, performance of GAN 126 may be considered sufficient when the specialized metrics used to judge the passwords exceeds a certain threshold. Following training of GAN 126 (and optionally following validation of performance of GAN 126), GAN 126 may be used to generate passwords for inclusion in potential password data set 130. As shown in FIG. 1, potential password generator system 120 may be communicatively coupled with and configured to output generated potential passwords to a computer storage medium storing potential password data set 130, which may be stored on any suitable medium and in any suitable format (e.g., stored as a database). In some embodiments, potential password data set 130 may be very large, including for example more than 10 billion potential passwords, more than 100 billion potential passwords, or more than 1 trillion potential passwords.

Once potential password data set 130 is generated by system 120, system 100 may compare potential password data set 130 against data corpus 140 in order to identify any strings in data corpus 140 that match a potential password included in potential password data set 130.

In some embodiments, data corpus 140 may be a corpus of data that may or may not contain one or more previously unknown passwords. For example, data corpus 140 may include plaintext data and/or structured data comprising one or more character strings that may or may not represent unknown passwords. Data corpus 140 may, in some embodiments, include a plurality of documents such as emails, word processing documents, workbooks, or the like. Data corpus 140 may, in some embodiments, include data that has been extracted from one or more documents. Data corpus 140 may, in some embodiments, include data captured via network downloads, such via one or more scraping operations that captures data from private networks and/or public networks (e.g., the internet). In some embodiments, data corpus 140 may be very large, for example including a total amount of data that is on the order of petabytes.

In some embodiments, system 100 may be configured to execute one or more comparisons between potential password data set 130 and data corpus 140 using password matching system 150. Password matching system 150 may include one or more processors and/or computer storage components configured to execute one or more data comparison techniques as described herein. As shown in FIG. 1, password matching system 150 may be communicatively coupled to and configured to receive input data (e.g., in the form of password data and/or associated metadata) from potential password data 130 set and from data corpus 140, each of which may be stored on any one or more suitable computer storage devices and in any suitable format (e.g., as respective databases).

In some embodiments, password matching system 150 may be configured to apply a simple deterministic comparison algorithm that determines whether each of one or more potential passwords in data set 130 matches any string in data corpus 140. However, due to the potentially massive size of data set 130 and of data corpus 140, such a deterministic comparison (e.g., using brute force or lookup tables) could be infeasible or impossible from a computational efficiency standpoint and/or from a storage resources standpoint. Accordingly, in some embodiments, password matching system 150 may be configured to apply one or more comparison/matching techniques that make identifying matching strings between data set 130 and data corpus 140 feasible and efficient.

In some embodiments, password matching system 150 may be configured to divide potential password data set 130 into a plurality of potential password data subsets 152, as shown in FIG. 1 by subsets 152*a*, 152*b*, and 152*c*. While the example in FIG. 1 shows three subsets, any suitable number of subsets (e.g., hundreds of subsets, thousands of subsets, or millions of subsets) may be used. In some embodiments, the generated subsets may include any suitable number of potential passwords taken from data set 130. In some embodiments, subsets 152 may be non-overlapping with one another in that a single potential password from data set 130 may appear in only a single generated subset. In some embodiments, subsets 152 may be overlapping with one another in that a single potential password from data set 130 may appear in multiple generated subsets.

After dividing data set 130 into the plurality of subsets 152, password matching system 150 may apply subset selection system 154 (which may include one or more processors and/or one or more computer storage devices configured to perform the functions described herein) in order to select one or more of the subsets 152. In some embodiments, subset selection system 154 may be configured to select one or more of the subsets 152 by making a determination as to whether one or more potential passwords in the subset is (a) likely to match a one or more strings in data corpus 140 or (b) certain not to match any string in data corpus 140. Subset selection system 154 may achieve this determination by leveraging a plurality of probabilistic data structures, such as Bloom filters, as explained below.

In some embodiments, subset selection system 154 may generate and store, for each of the subsets 152, a respective probabilistic data structure that represents, for a respective subset 152, each of the potential passwords in the respective subset. The probabilistic data structure may be configured such that it may be interrogated (e.g., queried) in order to determine whether query data is (a) probably included in the subset of passwords represented by the probabilistic data structure, with a predefined false positive rate, or (b) definitely not included in the subset of passwords represented by the probabilistic data structure. The predefined false-positive rate may be selected by a user and/or selected automatically by the system at the time of generating the plurality of probabilistic data structures, and may be chosen based on accuracy needs, storage resources available for the probabilistic data structures, and/or processing speed requirements.

After generating and storing the plurality of probabilistic data structures respectively representing the potential password subsets in subsets 152, system 150 may interrogate each of the probabilistic data structures using query inputs from data corpus 140 in order to determine whether the associated subset can be marked as (a) probably matching one or more strings in data corpus 140 or (b) definitely not matching one or more strings in data corpus 140. The processing time for querying the probabilistic data structures 152 may be extremely fast in comparison to performing a brute-force search through all of the potential passwords in each subset, and may therefore vastly improve processing times.

In some embodiments, individually querying each of the probabilistic data structures representing a subset 152 of the overall data set 130 may unto itself vastly improve processing times for determining whether a match to data corpus 140 (likely) exists. In some embodiments, processing times may be further improved by leveraging a hierarchical arrangement of probabilistic data structures. For example, in addition to creating a plurality of probabilistic data structures each representing an individual one of the subsets 152, subset selection system 154 may then group the subsets 152 into a plurality of groups and create a probabilistic data structure that encodes each of the groups. Thus, subsets 152 may be arranged into a hierarchical pyramid arrangement in which different probabilistic data structures represent different groupings of subsets 152, and in which the groupings may be locally nested within one another. This arrangement may be applied using a single level of "nesting" or using multiple levels of nesting. To query the nested probabilistic data structures, system 154 may begin by querying the "top level" probabilistic data structures (representing the largest number of subsets 152 grouped together) to determine whether each of the top-level data structures represent any underlying password data that represents a likely match against data corpus 140. For any "top level" probabilistic data structure indicating no match, none of the underlying probabilistic data structures need be thereafter further queried; however, for any "top level" probabilistic data structure indicating a likely match, the underlying probabilistic data structures at the next logical level down may then be queried to determine which of them a likely match against data corpus 140. This process may be continued to the lowest "level" of probabilistic data structures corresponding to single respecting subsets 152. In some embodiments, leveraging a hierarchical schema of nested probabilistic data structures in this manner may allow for processing times to be further improved, allowing for better-than-linear improvement in processing times as additional probabilistic data structures are leveraged by password matching system 150.

In the example of FIG. 1, it is shown that subset selection system 154 has identified subset 152a as a selected subset, indicating that subset 152 probably includes one or more potential passwords that match one or more strings in data corpus 140. Because this determination comes with the caveat of the predefined false-positive rate, system 100 may be configured, in some embodiments, to apply an additional matching algorithm to verify that the selection of the selected subset 152a was not due to a false-positive from subset selection system 154 and, if said verification is made, to determine which of one or more potential passwords in selected subset 152 matches one or more strings in data corpus 140.

As shown in FIG. 1, password matching system 150 may further include matching algorithm system 156, which may include any one or more processors configured to apply one or more matching algorithms to the selected subset 152a in order to identify any potential passwords therein that match a string from data corpus 140. Matching algorithm system 156 may be communicatively coupled with and configured to receive input data representing the selected subset 152a, and matching algorithm system 156 may be communicatively coupled with and configured to receive input data representing data corpus 140. Matching algorithm system 156 may, in some embodiment, apply a deterministic algorithm (e.g., brute force algorithm or look-up table algorithm) to determine which (if any) of the predicted passwords in selected subset 152a match one or more strings in data corpus 140. Matching algorithm system 156 may, in some embodiment, apply a probabilistic matching algorithm to compare selected subset 152a and data corpus 140 in order to identify one or more close matches. In some embodiments, a probabilistic matching algorithm may characterize or quantify a degree of similarity between two strings that are not necessarily exact matches for one another, for example by calculating a distance (e.g., Euclidean distance, Levenshtein distance, etc.) quantifying a similarity between strings that do not match exactly and/or quantifying a number of edits that would be required to transform one string into another. In some embodiments, a probabilistic matching algorithm may apply one or more predefined and/or dynamically-determined threshold values to determine whether a minimum threshold level of similarity exists between two strings.

In some embodiments, a probabilistic matching algorithm applied by system 156 may be configured for execution by a graphics processing unit (GPU). In this scenario, a massively-parallel GPU can be leveraged to compare many more strings simultaneously than would be possible using a central processing unit (CPU). If there are a sufficient number of strings to compare, the throughput of the GPU will often exceed that of a multicore CPU.

Matching algorithm system 156 may be configured to generate output data indicating one or more matching predicted passwords from selected subset 152a (optionally along with metadata about the predicted password, the data corpus in which it was matched, the manner in which the predicted password was generated, and/or the manner in which the predicted password and the string in the data corpus were matched. The output data generated by matching algorithm system 156 may be stored as discovered password output data set 160, which may be stored on any suitable computer storage device and in any suitable data format, such as being stored as a database of discovered passwords.

In some embodiments, before and/or after storage of a discovered password (e.g., a match between a predicted password in potential password data set 130 and a string in data corpus 140) in discovered password output data set 160, one or more automated or semi-automated actions may be taken by system 100 leveraging the discovered matching password.

In some embodiments, system 100 may automatically output one or more discovered matching passwords to a user of system 100, such as by displaying the discovered matching password, for example as part of a report or list. In some embodiments, system 100 may transmit data regarding the discovered matching passwords to one or more other systems.

In some embodiments, system 100 may apply one or more algorithms to the discovered matching password to attempt to determine or verify whether the discovered matching password is in fact a genuine password. For example, system 100 may automatically analyze contextual information from data corpus 140, such as contextual information regarding how the string is presented in plaintext data, the format of the file or files from which the strong was extracted, and/or other information regarding the origin of the string in data corpus 140. In some embodiments, system 100 may automatically generate and output an assessment (for example for display to a human user) regarding whether the system believes that additional contextual information indicates that the matching string is likely to be a genuine password.

In some embodiments, system 100 may automatically output contextual information regarding the discovered matching password, such as a reproduction of surrounding textual information (e.g., plaintext data) showing the context in which the string originally appeared in data corpus 140 and/or in one or more underlying files or documents. In some embodiment, system 100 may automatically output metadata regarding the discovered matching password, such as metadata regarding how the password was predicted by system 120, the data corpus 140 in which it the predicted password was matched, a file/document/location/source within the data corpus 140 in which the predicted password was matched, and/or the manner in which the predicted password and the string in data corpus 140 were matched by system 150. Said output information may be displayed to a user and/or transmitted to one or more other systems.

In some embodiment, system 100 may automatically apply one or more analytical algorithms to the discovered matching password to generate assessments and/or predictions regarding the discovered matching password. For example, one or more analytical algorithms may attempt to determine a location of origin, language of origin, system of origin, entity of origin, and/or person of origin for the predicted password. These predictions may be based at least in part on the discovered password string itself. These predictions may be based at least in part on contextual information taken from data corpus 140 regarding information associated with the manner in which the predicted discovered password appears in data corpus 140. These predictions may be based at least in part on information from known password set 110; for example, if the discovered matching password is highly similar to a previously leaked password, then system 100 may automatically determine that the password is likely used by a same entity or same person as the previously leaked password. The outputs generated by any of said analytical algorithms may be displayed to a user and/or transmitted to one or more other systems.

In some embodiments, system 100 may automatically apply one or more algorithms to generate a prediction of whether the discovered matching password is human-generated or machine-generated. The outputs generated by any of said predictions may be displayed to a user and/or transmitted to one or more other systems.

In some embodiments, system 100 may automatically apply one or more algorithms configured to assess or score a complexity, security, or strength level of the discovered matching password. The outputs generated by any of said assessments may be displayed to a user and/or transmitted to one or more other systems.

In some embodiments, system 100 may automatically attempt to apply the discovered matching password. For example, system 100 may automatically attempt to use the discovered matching passwords to unlock a device, gain access to a system, unlock or decrypt a file, or the like. In some embodiments, a result indicating whether any attempted application of the discovered matching password was successful may be generated and stored, and may be displayed to a user and/or transmitted to one or more other systems.

In some embodiments, system 100 may include a feedback loop by which one or more predicted passwords from selected subset 152a and/or discovered matching passwords from discovered password output data set 160 may be used to augment dictionary data set 124 and to facilitate further refinement and improve of the performance of GAN 126 and potential password generator system 120. As shown in FIG. 1, one or more predicted passwords from selected subset 152a and/or discovered matching passwords from discovered password output data set 160 may be transmitted from system 150 and/or data set 160 back to potential password generator system 120, forming a feedback loop. The predicted password data sent back to system 150 may be used to augment dictionary data set 124, such as by adding the predicted passwords from the selected subset 152a and/or the discovered matching passwords from data set 160 to dictionary data set 124.

As shown in FIG. 1, the feedback loop described above may in some embodiments include password extrapolation system 170. Password extrapolation system 170 may be any system including one or more processors configured to receive input password data and to generate, as output, one or more extrapolated passwords based thereon. In some embodiments, alternatively or in addition to adding passwords from selected subset 152a and/or from discovered password output data set 160 directly to dictionary data set 124, system 100 may be configured to apply password extrapolation system 170 to generate one or more extrapolated passwords based on the passwords from selected subset 152a and/or from discovered password output data set 160. In some embodiments, password extrapolation system 170 may apply one or more permutation and/or substitution algorithms (which may be referred to as extrapolation algorithms)) to the input password data in order to generate a plurality of closely related extrapolated passwords that are similar but not identical to the input password data. The permutation and/or substitution algorithms may apply one or more rulesets that contains one or more rules about how to transform one password into another. The rules may include character substitutions, insertions, permutations and/or deletions. They may additionally or alternatively include string duplication, reflection, and/or pluralization. Word rejection rules may also be present. In some embodiments, a permutation and/or substitution algorithm may be configured to generate extrapolated passwords that are sufficiently similar to the input passwords, for example by ensuring that the generated passwords have a sufficient degree of similarity to the input password(s) in accordance with one or more probabilistic matching algorithms (for example as discussed above). The extrapolated passwords may then be output from system 170 and added (optionally in addition to the input password data from selected subset 152*a* and/or from discovered password output data set 160) to dictionary data set 124.

After augmenting dictionary data set 124 using the password data from selected subset 152*a*, from output data set 160 and/or from password extrapolation system 170, system 120 may then re-train and/or further train GAN 126, in the manner described above, using the updated version of dictionary data set 124. Following re-training or additional training/refinement of GAN 126, GAN 126 may then be used to generate a new potential password data set and/or to add new potential passwords to potential password data set 130, and the process of applying password matching system 150 may be repeated using the new or updated potential password data set 130 (including by re-applying the password matching techniques to the same data corpus 140 and/or by applying the password matching techniques to one or more additional data corpuses. In this manner, newly discovered passwords may be used to improve the performance of GAN 126, and the improved performance of GAN 126 may then lead to the discovery of more new passwords, and the process may iterate repeatedly.

FIG. 2 depicts a method for password discovery, in accordance with some embodiments. In some embodiments, method 200 may be performed by a system for password discovery, such as system 100 as described above.

At block 202, in some embodiments, the system may receive a first password data set. The first password data set may include all or part of any one or more data sets of known passwords (and, optionally, any associated metadata), such as known passwords that have been voluntarily provided, obtained from prior data leaks, and/or obtained from prior password discovery efforts. In some embodiments, the first password data set may share any one or more characteristics in common with known password data set 110 described above with respect to FIG. 1.

At block 204, in some embodiments, the system may apply a rule set to the first password data set to generate a second password data set. In some embodiments, the system may apply a rule set configured to select and/or generate passwords to be stored in dictionary data set, wherein the rule set may include one or more filtering rules and/or one or more password generation rules. In some embodiments, the one or more rules to select and/or generate passwords for inclusion in a dictionary data set may be hard-coded deterministic rules, may be dynamically-applicable adaptive rules, may be programmatically-determined rules that are automatically determined based on one or more data inputs, and/or may be human-specified rules based on one or more manual inputs or configurations provided by a human user. In some embodiments, the one or more rules may be configured to generate passwords for inclusion in the dictionary data set that are believed to be similar (or identical) to passwords likely to be generated by humans, for example by applying rules that are based on spatial keyboard/keypad patterns.

In some embodiments, applying the rule set may share any one or more characteristics in common with applying one or more rule sets by dictionary data set selection/creation system 122 in order to generate content for dictionary data set 124 based on known password data set 110, as described above with respect to FIG. 1.

At block 206, in some embodiments, the system may train a generative adversarial network, for generating predicted passwords, using the second data set. In some embodiments, training of the GAN may include—in addition to making iterative adjustments to a generative model of the GAN and/or to a discriminative model of the GAN based on whether the discriminative component is successful or unsuccessful in classifying synthetic passwords generated by the generative component—additionally incentivizing the GAN during the training process to favor passwords that are included in the second data set (e.g., the dictionary data set). For example, the GAN may be configured such that, during training, if the generative component of the GAN generates a predicted password that matches a password that is included in the second data set, then a loss function of the GAN 126 may be adjusted (e.g., by a predetermined and/or dynamically determined amount) in order to incentivize the GAN to favor passwords that are included in (or similar to those that are included in) the second data set. In some embodiments, an amount by which a loss function is adjusted (e.g., reduced) may be based, at least in part, on a rule that was used to generate the password in second data set that was matched by the GAN. In some embodiments, training the GAN may share any one or more characteristics in common with training GAN 126, based at least in part on dictionary data set 124, described above with reference to FIG. 1.

At block 208, in some embodiments, the system may apply the generative adversarial network to generate a third password data set comprising a first plurality of predicted passwords. In some embodiments, apply the GAN to generate a third password data set may share any one or more characteristics in common with applying GAN 126 to generate potential password data set 130, as described above with respect to FIG. 1.

At block 210, in some embodiments, the system may compare the third password data set to a data corpus to identify a string in the data corpus determined to match one of the predicted passwords in the first plurality of predicted passwords. In some embodiments, comparing the third password data set to a data corpus may identify any matches (including exact matches and/or near matches) between the third data set and the data corpus, thereby identifying one or more strings in the data corpus that may represent previously undiscovered passwords that have been predicted by the GAN (or for which a similar password has been predicted by the GAN).

In some embodiments, comparing the third password data set to the data corpus to identify a matching string (e.g., an exact match or a near match) may include applying a deterministic comparison algorithm that determines whether each of one or more potential passwords in the third password data set matches any string in the data corpus.

In some embodiments, comparing the third password data set to the data corpus to identify a matching string may include dividing the third data set into a plurality of subsets and selecting one or more of the subsets, for example by leveraging probabilistic data structures associated respectively with one or more of the subsets to make a quick determination as to whether further processing of password data included in the subset may be required.

In some embodiments, comparing the third password data set to the data corpus to identify a matching string may include applying a matching algorithm, whether to the entire third password data set or to one or more selected subsets thereof. In some embodiments, applying a matching algorithm may include applying a deterministic algorithm (e.g., brute force algorithm or look-up table algorithm) and/or applying a probabilistic matching algorithm.

In some embodiments, comparing the third password data set to the data corpus to identify a matching string may share any one or more characteristics in common with any of the techniques applied by password matching system 150 in comparing potential password data set 130 to data corpus 140, as described above with reference to FIG. 1.

A matching string identified between the third data set and the data corpus may be a newly-discovered password.

At block 212, in some embodiments, the system may augment the second password data set based on the identified string in the data corpus. In some embodiments, augmenting the second data set may include adding the string itself (e.g., the newly discovered password) directly to the second data set. In some embodiments, augmenting the second data set may include adding one or more extrapolated passwords, which may be generated based on the identified string, to the second data set. In some embodiments, after augmenting the second data set, the GAN may be trained further to improve performance and then used to generate additional potential undiscovered passwords.

In some embodiments, augmenting the second data set may share any one or more characteristics in common with the augmentation of dictionary data set 124 by password extrapolation system 170, selected subset 152, and/or discovered password output data set 160, as described above with reference to FIG. 1.

At block 214, in some embodiments, the system may apply the identified string to unlock a password-protected device, system, or file. In some embodiments, the system may be configured to automatically leverage the matching string to unlock, access, and/or decrypt a password-protected device, system, and/or file (or to attempt to do so). In some embodiments, this action may be automatically undertaken by the system in response to a match being discovered; in some embodiments, the result (e.g., success or failure) of this action may be recorded in a log.

Figure 3:
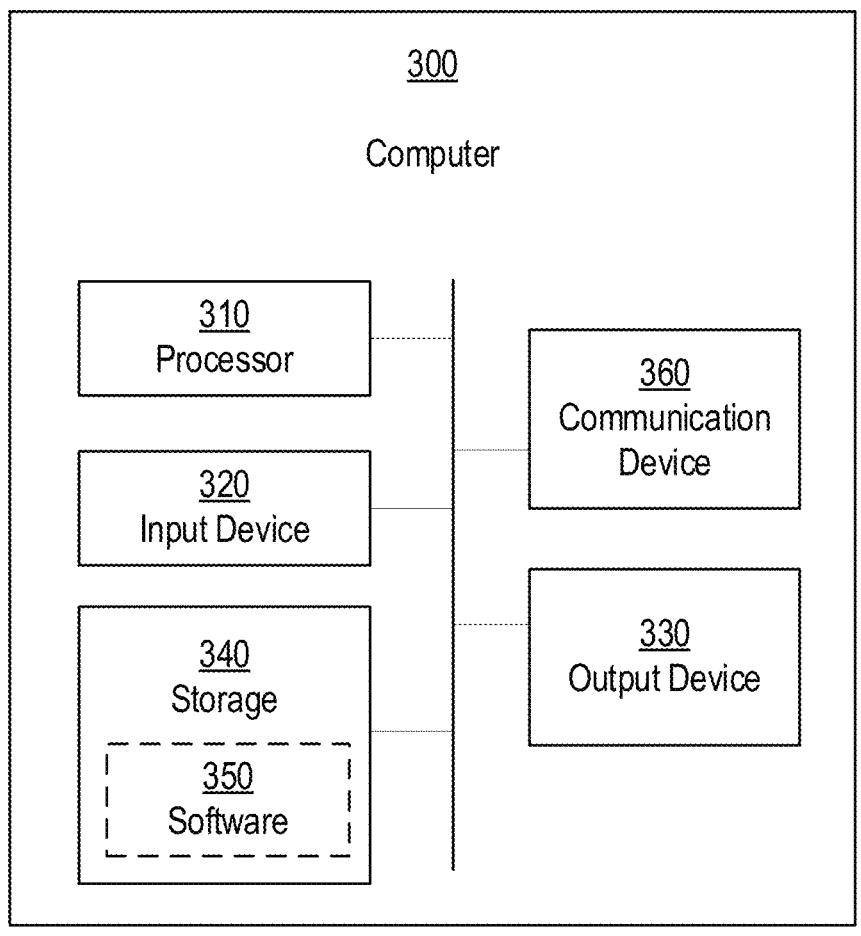
FIG. 3 depicts a computer, in accordance with some embodiments.

FIG. 3 illustrates a computer, in accordance with some embodiments. Computer 300 can be a component of a system for password discovery, such as system 100 and/or any of its subcomponents described above with reference to FIG. 1. In some embodiments, computer 300 may be configured to execute a method for password, such as all or part of method 200. In some embodiments, computer 300 may be configured to execute any of the other techniques discussed herein, alone and/or in combination with one another and/or with method 200.

Computer 300 can be a host computer connected to a network. Computer 300 can be a client computer or a server. As shown in FIG. 3, computer 300 can be any suitable type of microprocessor-based device, such as a personal computer; workstation; server; or handheld computing device, such as a phone or tablet. The computer can include, for example, one or more of processor 310, input device 320, output device 330, storage 340, and communication device 360.

Input device 320 can be any suitable device that provides input, such as a touch screen or monitor, keyboard, mouse, or voice-recognition device. Output device 330 can be any suitable device that provides output, such as a touch screen, monitor, printer, disk drive, or speaker.

Storage 340 can be any suitable device that provides storage, such as an electrical, magnetic, or optical memory, including a RAM, cache, hard drive, CD-ROM drive, tape drive, or removable storage disk. Communication device 360 can include any suitable device capable of transmitting and receiving signals over a network, such as a network interface chip or card. The components of the computer can be connected in any suitable manner, such as via a physical bus or wirelessly. Storage 340 can be a non-transitory computer-readable storage medium comprising one or more programs, which, when executed by one or more processors, such as processor 310, cause the one or more processors to execute methods described herein, such as all or part of method 200.

Software 350, which can be stored in storage 340 and executed by processor 310, can include, for example, the programming that embodies the functionality of the present disclosure (e.g., as embodied in the systems, computers, servers, and/or devices as described above). In some embodiments, software 350 can be implemented and executed on a combination of servers such as application servers and database servers.

Software 350 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 340, that can contain or store programming for use by or in connection with an instruction execution system, apparatus, or device.

Software 350 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines. Computer 300 may be composed of components which are interconnected across a network, such as a distributed system. Computer 300 may be organized into any suitable topology, such as a star topology, a recursively defined topology, a mesh topology, a ring topology, or an ad-hoc topology.

Computer 300 can implement any operating system suitable for operating on the network. Software 350 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Example 1

In one example, a generative adversarial network was trained using a training data set of 700,000 known passwords. The GAN was specially trained using techniques as described herein to favor a specific set of passwords in a set selected based on user-defined password generation rules, such that a loss function of the GAN was modulated whenever the GAN generated a password included in the specific set of passwords. The specially-trained GAN was then used to generate a set of approximately 10 million predicted passwords, and each of the approximately 10 million predicted passwords were deterministically checked for membership in a validation data set of 100,000 known passwords. As compared to a similarly-trained GAN that was trained without modulating a loss function to favor passwords in a specific subset selected based on user-defined rules, the specially-trained GAN showed a performance improvement of 10% over the standard GAN. That is, the specially-trained GAN predicted 10% more genuine passwords (about 5,500 of the 100,000 passwords) from the validation set than the standard GAN did (about 5,000 of the 100,000 passwords).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for identifying passwords in a data corpus, the system comprising memory storing instructions and one or more processors configured to execute the instructions to cause the system to:
    receive a first password data set comprising a plurality of known passwords;
    apply a rule-set to the first password data set to generate a second password data set;
train a generative adversarial network, for generating predicted passwords, using the second data set;
    apply the generative adversarial network to generate a third password data set comprising a first plurality of predicted passwords; and
    compare the third password data set to a data corpus to identify a string in the data corpus determined to match one of the predicted passwords in the first plurality of predicted passwords, wherein comparing the third password data set to the data corpus to identify the string in the data corpus comprises:

dividing the third password data set into a plurality of subsets; and
    selecting, based on comparison of each of the plurality of subsets to the data corpus, one of the plurality of subsets, wherein the identified string is included in the selected subset.

2. The system of claim 1, wherein selecting one of the plurality of subsets comprises: generating, based on the plurality of subsets, a plurality of respective probabilistic data structures; and
    querying, using the data corpus, each of the plurality of probabilistic data structures to determine whether each respective probabilistic data structure indicates (a) a probable match between the data corpus and one or more of the predicted passwords in the corresponding data set, or (b) a definite non-match between the data corpus and any of the predicted passwords in the corresponding data set.

3. The system of claim 2, wherein determining the probable match between the data corpus and the one or more of the predicted passwords in the corresponding data set is based on respective predefined false positive rates of the probabilistic data structures.

4. The system of claim 3, wherein the predefined false positive rates are selected at a time of generating the plurality of probabilistic data structures.

5. The system of claim 3, wherein the predefined false positive rates are selected based on one or more of the set comprising: accuracy needs, storage resources available for the probabilistic data structures, and processing speed requirements.

6. The system of claim 2, wherein the probabilistic data structures are attanged in a hierarchical arrangement with one another.

7. The system of claim 1, wherein applying the rule-set to the first password data set to generate the second password data set comprises filtering the first password data set to select a subset of the plurality of known passwords for inclusion in the second password data set.

8. The system of claim 1, wherein applying the rule-set to the first password data set to generate the second password data set comprises generating a second plurality of predicted passwords generated based on one or more of the plurality of known passwords.

9. The system of claim 1, wherein the one or more processors are further configured to augment the second password data set based on the identified string in the data corpus.

10. The system of claim 9, wherein augmenting the second password data set based on the identified string in the data corpus comprises:
    applying an extrapolation algorithm to the identified string to generate an extrapolated string; and
    adding the extrapolated string to the second password data set.

11. The system of claim 9, wherein augmenting the second password data set based on the identified string in the data corpus comprises:
    applying an extrapolation algorithm to a subset of the third password data set associated with the identified string to generate one or more extrapolated strings; and
adding the one or more extrapolated strings to the second password data set.

12. The system of claim 1, wherein comparing the third password data set to the data corpus to identify the string in the data corpus comprises applying a matching algorithm to identify the string in the data corpus.

13. The system of claim 12, wherein the matching algorithm comprises one or both of: a deterministic matching algorithm, and a probabilistic matching algorithm.

14. The system of claim 1, wherein comparing the third password data set to the data corpus to identify the string in the data corpus comprises:

dividing the third password data set into a plurality of subsets;

selecting, based on comparison of each of the plurality of subsets to the data corpus, one of the plurality of subsets, wherein the identified string is included in the selected subset.

15. The system of claim 14, wherein selecting one of the plurality of subsets comprises: generating, based on the plurality of subsets, a plurality of respective probabilistic data structures; and querying, using the data corpus, each of the plurality of probabilistic data structures to determine whether each respective probabilistic data structure indicates (a) a probable match between the data corpus and one or more of the predicted passwords in the corresponding data set, or (b) a definite non-match between the data corpus and any of the predicted passwords in the corresponding data set.

16. The system of claim 1, wherein the one or more processors are further configured to apply the identified string to unlock a password-protected device, system, or file.

17. A non-transitory computer-readable storage medium storing instructions for identifying passwords in a data corpus, the instructions configured to be executed by one or more processors of a system to cause the system to:

receive a first password data set comprising a plurality of known passwords;

apply a rule-set to the first password data set to generate a second password data set;

train a generative adversarial network, for generating predicted passwords, using the second data set;

apply the generative adversarial network to generate a third password data set comprising a first plurality of predicted passwords; and compare the third password data set to a data corpus to identify a string in the data corpus determined to match one of the predicted passwords in the first plurality of predicted passwords, wherein comparing the third password data set to the data corpus to identify the string in the data corpus comprises:

dividing the third password data set into a plurality of subsets; and selecting, based on comparison of each of the plurality of subsets to the data corpus, one of the plurality of subsets, wherein the identified string is included in the selected subset.

18. A method for identifying passwords in a data corpus, the method performed by a system comprising one or more processors, the method comprising:

receiving a first password data set comprising a plurality of known passwords;

applying a rule-set to the first password data set to generate a second password data set;

training a generative adversarial network, for generating predicted passwords, using the second data set;

applying the generative adversarial network to generate a third password data set comprising a first plurality of predicted passwords; and comparing the third password data set to a data corpus to identify a string in the data corpus determined to match one of the predicted passwords in the first plurality of predicted passwords, wherein comparing the third password data set to the data corpus to identify the string in the data corpus comprises:

dividing the third password data set into a plurality of subsets; and selecting, based on comparison of each of the plurality of subsets to the data corpus, one of the plurality of subsets, wherein the identified string is included in the selected subset.

* * * * *